United States Patent
Kano et al.

(10) Patent No.: US 7,769,480 B2
(45) Date of Patent: Aug. 3, 2010

(54) WRITING METHOD OF HARDWARE PERFORMANCE INFORMATION OF UNIT IN VEHICLE

(75) Inventors: Tomoyuki Kano, Toyota (JP); Masato Matsubara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 310 days.

(21) Appl. No.: 11/135,509

(22) Filed: May 24, 2005

(65) Prior Publication Data

US 2005/0267618 A1  Dec. 1, 2005

(30) Foreign Application Priority Data

May 27, 2004  (JP)  ............... 2004-157480

(51) Int. Cl.
G06F 19/00 (2006.01)
G06F 11/30 (2006.01)
G01M 17/00 (2006.01)
G05D 1/00 (2006.01)
G01C 21/00 (2006.01)
G05B 1/02 (2006.01)

(52) U.S. Cl. ............... 700/108; 318/605; 701/1; 701/29; 701/35; 701/123; 701/215

(58) Field of Classification Search ............... 701/29, 701/1, 35, 123, 215; 700/108; 707/1; 318/605; 702/183

See application file for complete search history.

(56) References Cited

U.S. PATENT DOCUMENTS

| 6,155,948 A | 12/2000 | Gierer |
| 6,687,587 B2 * | 2/2004 | Kacel ............... 701/33 |
| 6,700,476 B1 * | 3/2004 | Okada et al. ............... 340/5.62 |
| 6,836,710 B2 * | 12/2004 | Yamaki ............... 701/33 |

(Continued)

FOREIGN PATENT DOCUMENTS

GB  2 381 880 A  5/2003

(Continued)

OTHER PUBLICATIONS

European Search Report for EP 45126, Oct. 21, 2009, 3 pgs.

(Continued)

*Primary Examiner*—Albert DeCady
*Assistant Examiner*—Thomas H Stevens
(74) *Attorney, Agent, or Firm*—Oliff & Berridge, PLC

(57) ABSTRACT

In an inspection procedure of a completed product of an automatic transmission main body at a unit factory, a control system transmits a control signal to an actuator to receive characteristic data (hardware performance information) output in response to operation of the automatic transmission main body according to the control signal. The hardware performance information of the automatic transmission main body is brought into correspondence with hardware identification information, and set in a database as learning value data. The learning value data of the automatic transmission main body is transferred to a vehicle factory to be aggregated in a database management system at the vehicle factory. When the automatic transmission main body is assembled with an electronic control device, learning value data of the automatic transmission main body is read out based on the hardware identification information from the database management system, and written into an AT_ECU during the inspection procedure of a completed vehicle at the vehicle factory.

6 Claims, 5 Drawing Sheets

U.S. PATENT DOCUMENTS

| | | | |
|---|---|---|---|
| 6,957,133 B1 * | 10/2005 | Hunt et al. | 701/29 |
| 6,993,421 B2 * | 1/2006 | Pillar et al. | 701/33 |
| 6,996,517 B1 * | 2/2006 | Papaefstathiou | 703/22 |
| 7,072,645 B2 * | 7/2006 | Schwinke et al. | 455/415 |
| 7,152,779 B2 * | 12/2006 | Yamagiwa | 235/375 |
| 7,484,008 B1 * | 1/2009 | Gelvin et al. | 709/249 |
| 2003/0055812 A1 * | 3/2003 | Williams et al. | 707/1 |
| 2003/0194326 A1 | 10/2003 | Bettenhausen et al. | |
| 2005/0288986 A1 * | 12/2005 | Barts et al. | 705/9 |

FOREIGN PATENT DOCUMENTS

| | | | |
|---|---|---|---|
| JP | A 5-215206 | 8/1993 | |
| JP | A 7-332142 | 12/1995 | |
| JP | A 10-131802 | 5/1998 | |
| JP | A 2002-188544 | 7/2002 | |
| JP | A-2003-120413 | 4/2003 | |
| JP | A 2003-254418 | 9/2003 | |
| JP | A 2004-84890 | 3/2004 | |
| WO | WO 02/44543 A2 | 6/2002 | |

OTHER PUBLICATIONS

Mar. 16, 2010 Office Action for Japanese Patent Application No. 2004-157480 (with translation).

* cited by examiner

WRITING METHOD OF HARDWARE PERFORMANCE INFORMATION OF UNIT IN VEHICLE This nonprovisional application is based on Japanese Patent Application No 2004-157480 filed with the Japan Patent Office on May 27, 2004, the entire contents of which are hereby incorporated by reference.

BACKGROUND OF THE INVENTION

1. Field of the Invention

The present invention relates to a method of writing hardware performance information of a unit incorporated in a vehicle. Particularly, the present invention relates to a method of writing hardware performance information for a control device of a unit.

2. Description of the Background Art

In the field of vehicle manufacturing, there is employed a production system of manufacturing a plurality of units constituting a vehicle at a plurality of different factories directed to each unit, and then assembling respective completed units together at a vehicle factory to form a unitary vehicle.

For example, an electronic control type transmission incorporated in a vehicle includes an automatic transmission main body and an electronic control device, each manufactured at different unit factories. The automatic transmission main body and the electronic control device delivered from respective factories are assembled at the vehicle factory, whereby a product of the electronic control type transmission is completed.

The automatic transmission main body includes electric components such as a plurality of solenoids and sensors for gear control and oil pressure control. Each automatic transmission main body has individual specificity, and the electric components exhibit some variation in the output property reflecting configuration variation generated during the manufacturing stage.

If the automatic transmission main body and electronic control device are assembled at random at the vehicle factory, deviation of the output property of the corresponding automatic transmission main body from the standard value, if any, cannot be corrected by the electronic control device, resulting in the additional increase of variation in the gear performance of the automatic transmission as a whole.

The need arises for an electronic control device to correct the control procedure based on the hardware performance information unique to each automatic transmission main body in various control operations in order to suppress variation in the transmission performance between automatic transmissions. Japanese Patent Laying-Open No. 05-215206, for example, discloses one such means.

FIG. 5 is a schematic diagram to describe an electronic control type transmission disclosed in the aforementioned publication.

Referring to FIG. 5, an electronic control type transmission includes an automatic transmission main body 60, and an electronic control device 70 installed at a site distant from automatic transmission main body 60.

Automatic transmission main body 60 includes a plurality of solenoids 62 for gear control and oil pressure control, a plurality of sensors 64 such as a vehicle speed sensor and throttle opening sensor, and a characteristic storage device 66 storing the characteristics of these control components. Each of the plurality of solenoids 62, the plurality of sensors 64, and characteristic storage device 66 is connected to electronic control device 70.

Characteristic storage device 66 stores the characteristics of solenoid 62 and sensor 64. For example, the output oil pressure property having a variation of a predetermined width with respect to the duty ratio is stored for the solenoid directed to oil pressure control.

At the time of initiating gear control, electronic control device 70 reads in a signal from characteristic storage device 66. At this stage, electronic control device 70 corrects the duty ratio based on the level of deviation of the output oil pressure with respect to the standard value. Accordingly, the control effected in practice will correspond to a solenoid 62 based on characteristics within the range of the standard value, even if the characteristics of solenoid 62 vary.

According to the automatic transmission of FIG. 5, variation in the gear performance can be reduced in totality of the automatic transmission. However, the manufacturing cost will be increased since it is necessary to incorporate a characteristic storage device 66 for each automatic transmission main body 60.

There is proposed a method of storing the hardware performance information of automatic transmission main body 60 on the part of electronic control device 70, taking into account the cost perspective (for example, refer to Japanese Patent Laying-Open No. 2003-254418).

FIG. 6 is a schematic diagram to describe the method of storing hardware performance information for an automatic transmission disclosed in Japanese Patent Laying-Open No. 2003-254418.

Referring to FIG. 6, this method includes the step of conducting a characteristic test on each individual unit to obtain test data after inspection of a completed product of automatic transmission main body 60 (step S100).

The spring set load, piston stroke, and clutch μ are obtained based on the test data (step S101).

Further, respective constants for gear control are determined based on respective values obtained (step S102). Specifically, the spring height is determined based on the spring set load; the stroke distance is determined from the piston stroke; and the pitch is determined from clutch μ. The determined spring height, stroke distance, and pitch are displayed as characteristic identification marks based on different colors, bar code, signs and the like (step S103).

Then, a label 80 with a characteristic identification mark is produced (step S104). This label 80 is attached at an appropriate site of a corresponding automatic transmission main body 60 (step S105).

Although not depicted, a characteristic identification mark is also attached in a similar manner for the control valve. The service personnel views the label attached to automatic transmission main body 60 and the control valve to write the constants for oil pressure control and gear control corresponding to each characteristic identification mark into a storage circuit of the electronic control device (not shown). A label with a constant identification mark corresponding to the written constants is attached to the electronic control device.

Eventually, the control valve is assembled with automatic transmission main body 60. Electrical connection is established between the electronic control device and automatic transmission main body 60 to complete an automatic transmission product.

As an alternative means to store hardware performance information of automatic transmission main body 60 into electronic control device 70, the means for detecting the hardware performance information of automatic transmission main body and writing the data into electronic control device 70 at a vehicle factory is known.

Although the automatic transmission of FIG. 6 does not require a characteristic storage device to be provided for each automatic transmission main body 60, it is mandatory that label 80 with the characteristic identification mark maintains a predetermined quality over a long span starting from the manufacturing stage at the unit factory until the time of repair at the service factory. In other words, label 80 must be durable towards degradation over time such as being peeled off or scratched away. Furthermore, a site of attachment must be ensured so as to facilitate visibility.

Furthermore, in order to store the hardware performance information of automatic transmission main body 60, the information must be written into electronic control device 70 for each unit based on the characteristic identification mark on label 80 at the time of manufacturing or repairing the automatic transmission. Productivity was not necessarily high.

In general, automatic transmission main body 60 is shipped to the vehicle factory after being inspected at the unit factory. This means that inspection of automatic transmission main body 60 will be carried out redundantly at the vehicle factory in the case where detection of the hardware performance information of automatic transmission main body 60 is conducted at the vehicle factory. This is one cause of degrading the productivity.

SUMMARY OF THE INVENTION

In view of the foregoing, an object of the present invention is to provide a writing method of hardware performance information, superior from the standpoint of cost and productivity.

According to an aspect of the present invention, a writing method of hardware performance information of a unit into a control device of that unit includes the steps of: at a unit factory, obtaining hardware performance information of a unit, and setting the obtained hardware performance information into correspondence with hardware identification information that identifies a unit in a database; and at an assembly factory, reading out and writing into a control device of a unit the hardware identification information of that unit from the database based on the hardware performance information when that unit and the control device of that unit are assembled.

Preferably, the writing method of hardware performance information further includes the step of transferring the hardware performance information and hardware identification information in the database to a database management system at the assembly factory. In the step of writing into a control device of a unit, hardware performance information of a unit is read out and written into the control device of that unit from the database management system at the assembly factory based on the hardware performance information when that unit and the control device of that unit are assembled.

Preferably, the step of transferring to a database management system at the assembly factory employs an information recording medium or a telecommunication system as an information transmission medium.

Preferably, the writing method of hardware performance information further includes the steps of: transferring the hardware performance information and hardware identification information in the database to a database management system at a repair factory, and when at least one of a unit and the control device of that unit is exchanged at the repair factory, reading out the hardware performance information of that unit from the database management system at the repair factory and writing the hardware performance information read out into the control device of that unit, based on the hardware identification information.

Preferably, the step of transferring to a database management system at a repair factory employs an information recording medium or a telecommunication system as an information transmission medium.

Preferably, the unit factory includes a control system corresponding to the control device of a unit. The step of obtaining hardware performance information of a unit includes the step of obtaining hardware performance information through a performance checkup using the control system of that unit.

Since the hardware performance information of a unit is set in a database and fetched afterwards from the database at the time of assembly in the present invention, it is not necessary to execute performance checkup of a unit again at the assembly factory. Thus, productivity can be improved.

When a unit or the control device of that unit is exchanged at the repair factory, hardware identification information of the corresponding unit can be obtained from the database. It is therefore not necessary to execute performance checkup of a unit again at the repair factory, allowing improvement of the repair efficiency.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
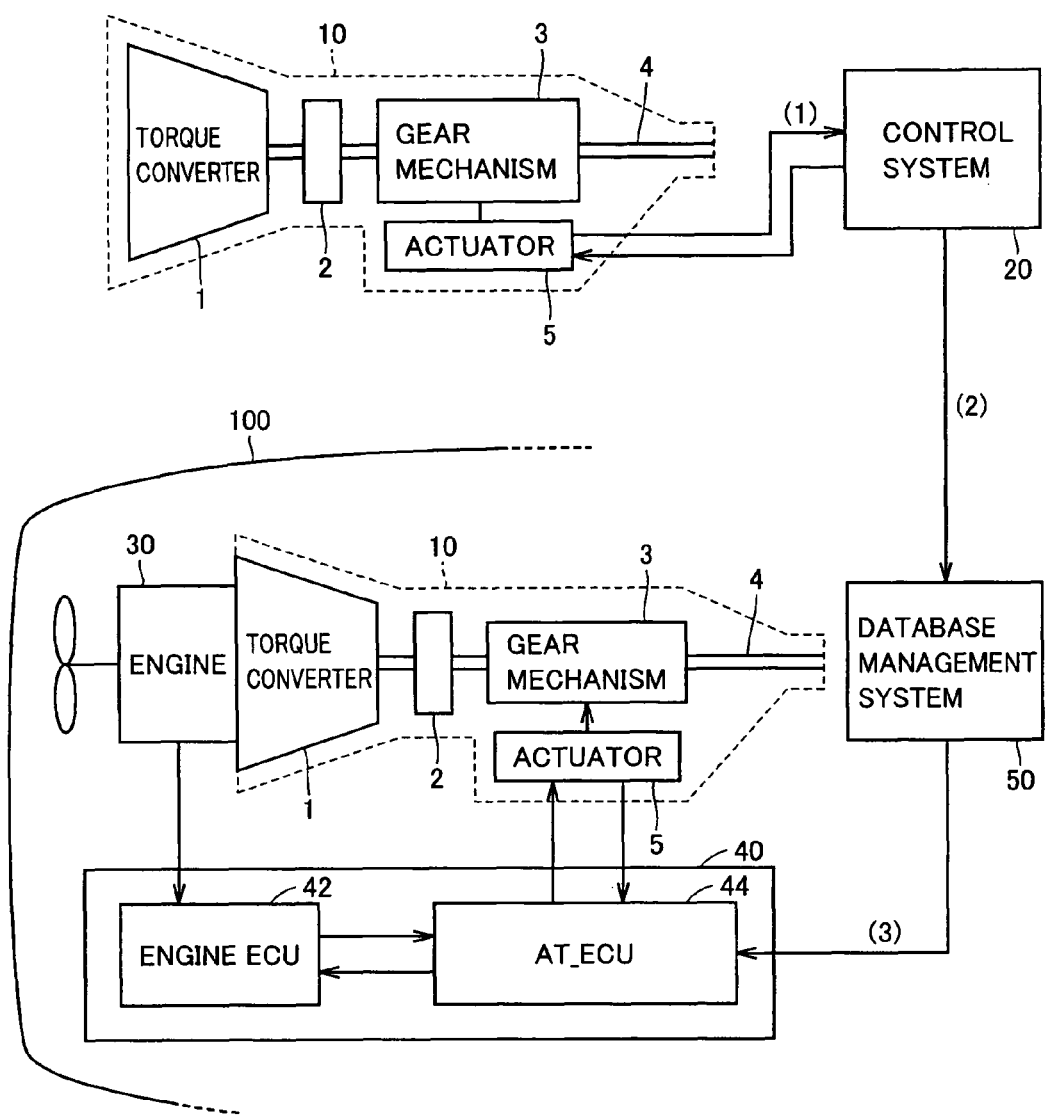
FIG. 1 is a schematic diagram to describe a writing method of hardware identification information according to a first embodiment of the present invention.

Embodiments of the present invention will be described in detail hereinafter with reference to the drawings. In the drawings, the same reference characters denote the same or corresponding elements.

First Embodiment

A method of writing hardware performance information according to a first embodiment of the present invention will be described hereinafter with reference to FIG. 1. Although the embodiments set forth below are based on an automatic transmission main body as the unit corresponding to hardware performance information, the present invention is applicable to other units incorporated in a vehicle.

Referring to FIG. 1, the writing method of hardware performance information is mainly divided into three procedures. The first, second, and third procedures are represented by the reference characters of (1), (2), and (3), respectively, in FIG. 1.

The first procedure (corresponding to (1) in FIG. 1) is executed at a unit factory. At the unit factory, the performance information of each completed product of a unit (corresponding to automatic transmission main body 10) is obtained at the inspection stage of a completed unit (corresponding to (a) in FIG. 1).

Automatic transmission main body 10 includes a torque converter 1, an oil pump 2, a gear mechanism 3, an output shaft 4, and an actuator 5.

When actuator 5 is assembled so as to establish electrical connection with an electronic control device not shown, an internal solenoid valve is actuated to switch the oil passage for transmission and lockup in response to a control signal from the electronic control device. The electronic control device not shown determines the gear pattern and lockup pattern to output relevant control signals based on the detected result of the running status (vehicle speed, load, and the like) by sensors not shown.

The plurality of automatic transmission main bodies 10 produced at the unit factory have performance information unique to each unit induced by variation in the electrical characteristics of the solenoid valve and sensors, as well as variation in the oil pressure characteristics caused by configuration variation in the cross sectional area of the oil passage and the like. By obtaining the hardware performance information of each unit in advance and correct the control procedure that is to be carried out by the electronic control device based on the obtained information, variation in the gear performance between automatic transmissions can be suppressed.

In the present embodiment, a control system 20 installed at the unit factory is electrically connected with automatic transmission main body 10. A control signal is transmitted from control system 20 to actuator 5. Characteristic data output in response to operation of automatic transmission main body 10 according to a control signal is received at control system 20. The received output characteristic data is brought into correspondence with the hardware identification information of automatic transmission main body 10 (for example, serial number) as the hardware performance information of automatic transmission main body 10, and set in a database as learning value data.

At the second procedure (corresponding to (2) in the drawing), the learning value data of automatic transmission main body 10 set in a database is transferred to a vehicle factory. Such data transfer means includes, for example, a magnetic disk medium such as a floppy (registered trademark) disk, and an optical disk medium such as a CD-R (Compact Disk-Recordable). Alternatively, a configuration of transferring the data through information network means such as a LAN (Local Area Network) may be employed. The transferred learning value data is aggregated at a database management system 50 installed at the vehicle factory, as shown in FIG. 1.

At the vehicle factory, the final third procedure (corresponding to (3)) is executed at the inspection stage of a completed vehicle (corresponding to (b) in FIG. 1).

At the vehicle factory, respective units delivered from respective unit factories are assembled together to complete a vehicle. For automatic transmission, automatic transmission main body 10 is coupled with an engine 30, which are electrically connected to an electronic control device 40 for control thereof.

Electronic control device 40 includes an engine ECU 42 to control engine 30, and an AT_ECU 44 to control automatic transmission main body 10. In the assembly procedure, engine 30 is electrically connected to engine ECU 42. Automatic transmission main body 10 is electrically connected to AT_ECU 44.

Upon completion of the vehicle assembly, learning value data unique to the incorporated automatic transmission main body 10 is read out from database management system 50 based on the hardware identification information. The learning value data is written into a storage circuit (not shown) in AT_ECU 44.

The writing of learning value data may be implemented so as to be down-loaded directly from control system 20 of the unit factory, instead of through database management system 50 of the vehicle factory.

Accordingly, AT_ECU 44 corrects the deviation between the learning value data and the standard value of a corresponding automatic transmission main body 10 to effect actual control. Since control is effected taking into consideration the characteristic unique to each unit in the gear operation thereafter, variation in the gear performance of the entire automatic transmission can be suppressed.

Even in the case where the gear operation cannot be conducted properly without the learning value data in AT_ECU 44, control taking into consideration the characteristic unique to each unit can be effected since the learning value data unique to automatic transmission main body 10 is written into the storage circuit in AT_ECU 44 when the vehicle assembly is completed.

Figure 2:
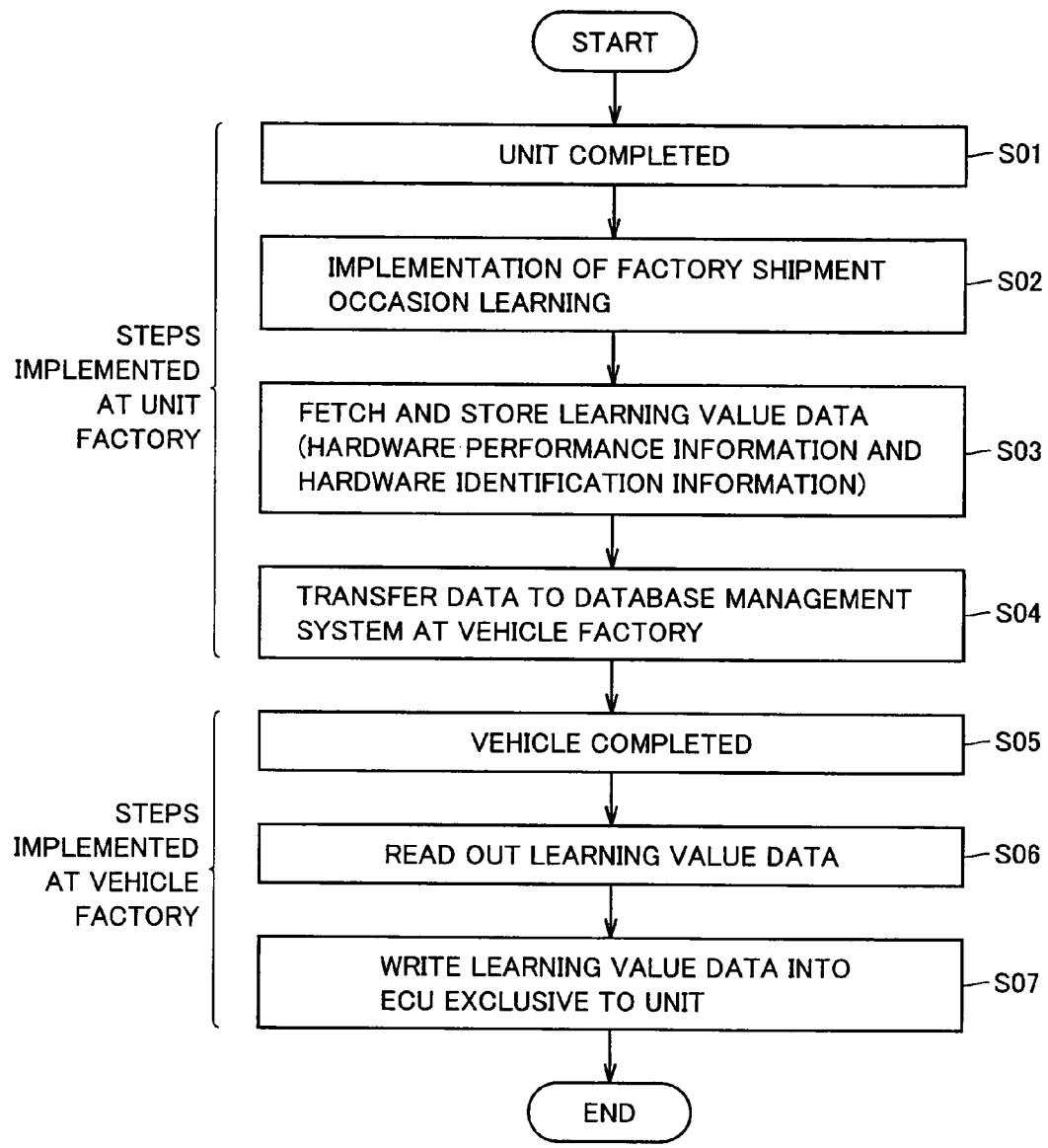
FIG. 2 is a flow chart to execute the writing method of hardware performance information of FIG. 1.

FIG. 2 is a flow chart to execute the writing method of hardware performance information of FIG. 1.

When a unit is completed at the unit factory (step S01), factory shipment occasion learning is implemented during the product inspection stage (step S02). At automatic transmission main body 10, the output characteristic data (=hardware performance information) is obtained when automatic transmission main body 10 is operated in response to the control signal transmitted from control system 20 to actuator 5, as described with reference to FIG. 1.

The obtained hardware performance information is brought into correspondence with the hardware identification information that is required to identify each automatic transmission main body 10 (serial number, or the like), and applied to control system 20 as the learning value data. The learning value data is stored in a database (step S03).

The learning value data for each unit is transferred to database management system 50 provided at the vehicle factory (step S04).

At the vehicle factory, various units delivered from respective unit factories are assembled to complete a vehicle (step S05). Then, the learning value data of the incorporated unit is read out from database management system 50 (step S06). The learning value data is written into an electronic control device 40 exclusive to the unit (step S07). Accordingly, electronic control device 40 can correct the deviation between the learning value data and the standard value, or actually effect control based on the learning value data.

Since the performance information unique to each incorporated unit is transferred to the vehicle factory in a database format to be written into a relevant electronic control device in accordance with the first embodiment of the present invention, performance information can be readily and reliably stored in the electronic control device, allowing the productivity to be increased.

Second Embodiment

The first embodiment is directed to a writing method of hardware performance information of a unit at the time of manufacturing, whereby the productivity can be improved. The second embodiment is directed to improving the repair efficiency and cost by applying the writing method also to the repair stage at a service factory.

Figure 3:
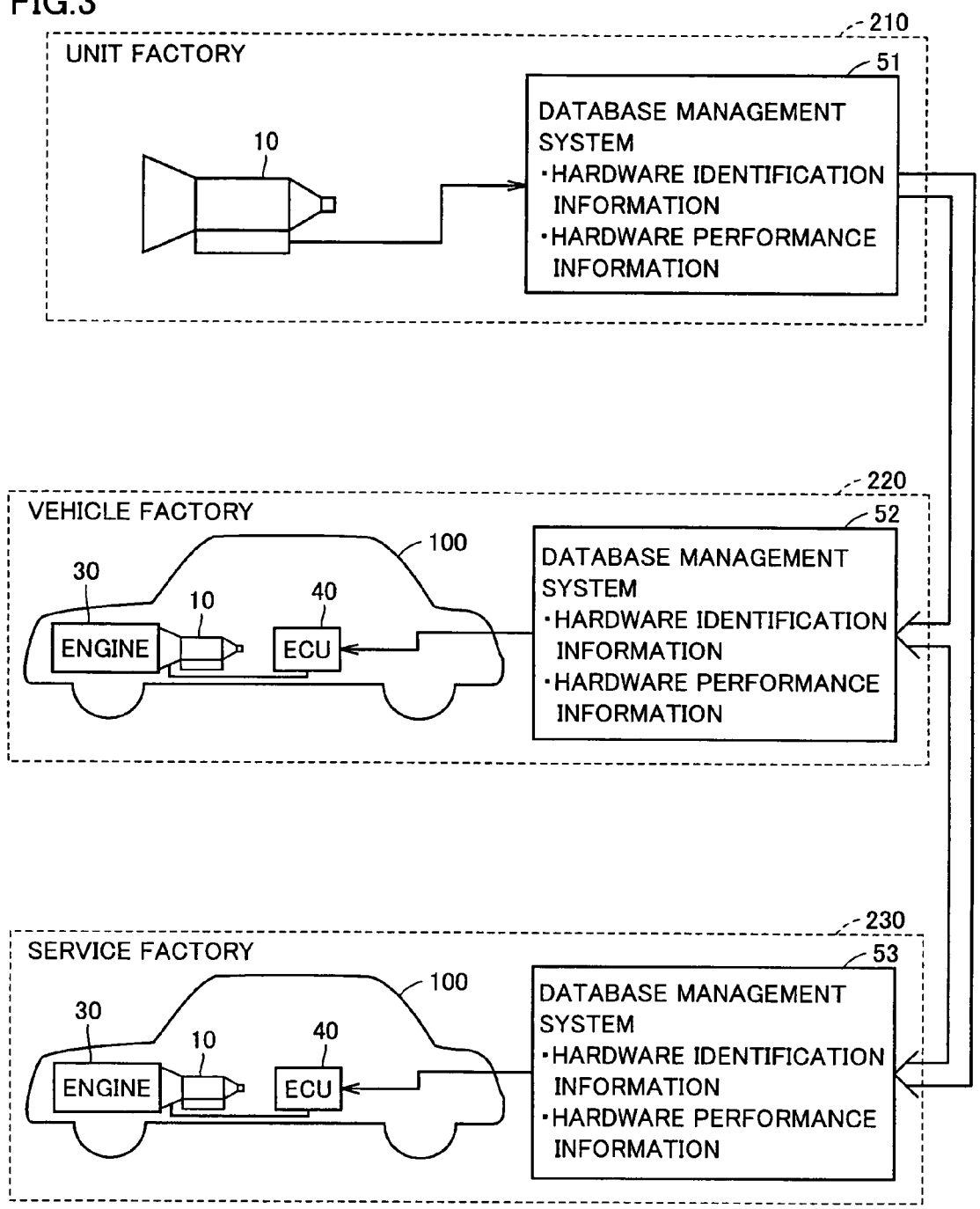
FIG. 3 is a schematic diagram to describe a writing method of hardware performance information according to a second embodiment of the present invention.

FIG. 3 is a schematic diagram to describe a writing method of hardware performance information according to a second embodiment of the present invention.

Likewise the procedure described with reference to FIG. 1, factory shipment occasion learning is executed on the completed unit (here, automatic transmission main body 10) at a unit factory 210. The hardware performance information is obtained in correspondence with hardware identification information. The hardware performance information and hardware identification information are stored in a database management system 51.

At a vehicle factory 220, respective units are assembled to complete a vehicle 100. For example, automatic transmission main body 1 is integrated with engine 30, and electrically connected with electronic control device 40.

The hardware performance information and hardware identification information of each unit are transferred from database management system 51 installed at unit factory 210 to a database management system 52 installed at vehicle factory 220. Information of the unit corresponding to the hardware identification information is read out from database management system 52, and written into electronic control device 40. Accordingly, electronic control device 40 effects control that has been corrected corresponding to the performance information of each unit.

In the second embodiment, a data management system 53 is installed at a service factory 230 that conducts vehicle repair. The hardware performance information of a unit is set into correspondence with the hardware identification information and transferred to data management system 53 in parallel with the shipment of a unit from unit factory 210 to service factory 230. When an automatic transmission main body 10, for example, is exchanged at the repair stage, hardware performance information corresponding to the exchanged automatic transmission main body 10 is read out and written into electronic control device 40. Alternatively, when electronic control device 40 is exchanged, the hardware performance information of automatic transmission main body 10 connected to the exchanged electronic control device 40 is written into the exchanged electronic control device 40.

By the configuration set forth above, the hardware performance information of a unit can also be shared by the service factory as well as by the vehicle factory. Therefore, the performance checkup of a unit repeatedly carried out after a vehicle is completed and after repair can be skipped to improve efficiency of the inspection work and repair work.

Figure 4:
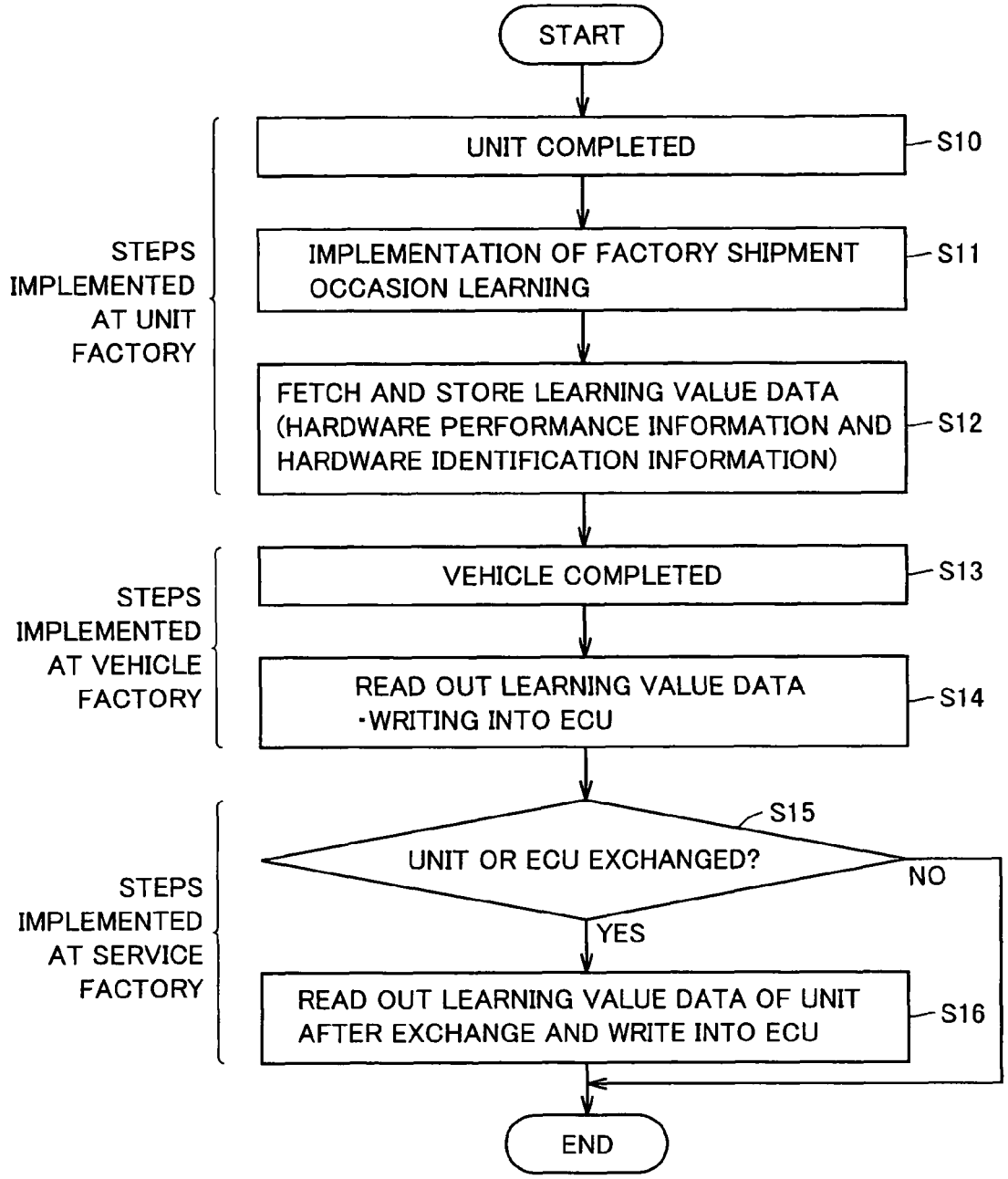
FIG. 4 is a flow chart to execute the writing method of hardware performance information of FIG. 3.
Figure 5:
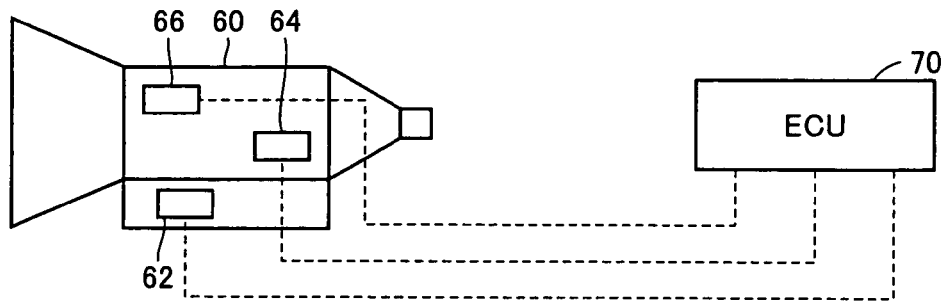
FIG. 5 is a schematic diagram to describe the electronic control type transmission disclosed in Japanese Patent Laying-Open No. 05-215206.
Figure 6:
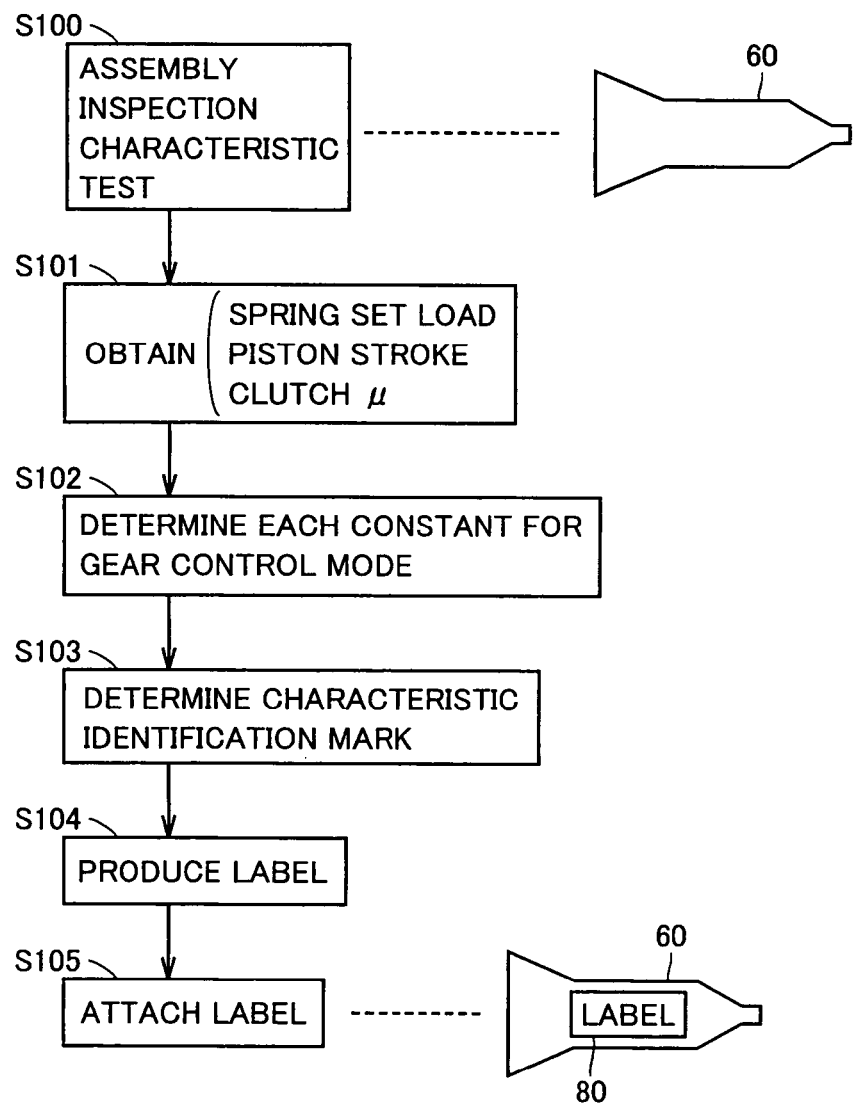
FIG. 6 is a schematic diagram to describe an automatic transmission disclosed in Japanese Patent Laying-Open No. 2003-254418.

FIG. 4 is a flow chart to execute the writing method of hardware performance information of FIG. 3. Steps S10-S12 implemented at the unit factory and steps S13-S14 implemented at the vehicle factory are similar to steps S01-S04 and steps S04-S07, respectively, described previously with reference to FIG. 2. Therefore, detailed description of similar steps will not be repeated.

Referring to the flow chart of FIG. 4, upon completion of the step implemented at the vehicle factory, inspection of the completed product is executed, and the vehicle is shipped. In the case of repair at the service factory, the learning value data (hardware performance information and hardware identification information) of the exchanged unit, when a unit or an electronic control device is exchanged as in step S15, is read out from database management system 53 and written into the relevant electronic control device 40 (step S16).

By sharing the hardware performance information of a unit at the unit factory, vehicle factory, and service factory in accordance with the second embodiment of the present invention, repair efficiency can be improved in addition to improvement in productivity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A writing method of hardware performance information of a unit into a control device of said unit, comprising the steps of:

at a unit factory of said unit, when said unit is being manufactured, obtaining hardware performance information of said unit, at the unit factory of said unit, when said unit is being manufactured, setting the obtained hardware performance information into correspondence with hardware identification information required to identify said unit in a database, and at an assembly factory, when various units delivered from respective unit factories are assembled to complete a new vehicle, reading out the hardware performance information of said unit from said database, and writing the hardware performance information read out into said control device of said unit, based on said hardware identification information, the hardware performance information corresponds to learning value data that is unique to the unit assembled into the new vehicle wherein said unit and said control device of said unit are shipped from different unit factories and assembled at said assembly factory.

2. The writing method of hardware performance information according to claim 1, further comprising the step of transferring the hardware performance information and hardware identification information in the database to a database management system at said assembly factory, wherein said step of writing into a control device of a unit includes the step of, when said unit is assembled with the control device of said unit in said assembly factory, reading out the hardware performance information of said unit from the database management system at said assembly factory, and writing said hardware performance information into said control device of said unit based on said hardware performance information.

3. The writing method of hardware performance information according to claim 2, wherein said step of transferring to a database management system at said assembly factory employs an information recording medium or a telecommunication system as an information transmission medium.

4. The writing method of hardware performance information according to claim 1, further comprising the steps of:

transferring the hardware performance information and hardware identification information in said database to a database management system at a repair factory, and when at least one of said unit and the control device of said unit is exchanged at the repair factory, reading out the hardware performance information of said unit from the database management system at said repair factory and writing said hardware performance information into the control device of said unit, based on said hardware identification information.

5. The writing method of hardware performance information according to claim 4, wherein said step of transferring to a database management system at a repair factory employs an information recording medium or a telecommunication system as an information transmission medium.

6. The writing method of hardware performance information according to claim 1, wherein
said unit factory includes a control system corresponding to a control device of said unit, and
said step of obtaining hardware performance information of a unit includes the step of obtaining said hardware performance information through a performance checkup using said control system of said unit.

* * * * *